US010861349B2

(12) United States Patent
Mohammed et al.

(10) Patent No.: US 10,861,349 B2
(45) Date of Patent: Dec. 8, 2020

(54) POSITIONAL ANALYSIS FOR PRAYER RECOGNITION

(71) Applicant: Ansarullah Ridwan Mohammed, Caroni (TT)

(72) Inventors: Ansarullah Ridwan Mohammed, Caroni (TT); Muhammad Abdurrahman, Minneapolis, MN (US)

(73) Assignee: Ansarullah Ridwan Mohammed, Caroni (TT)

( * ) Notice: Subject to any disclaimer, the term of this patent is extended or adjusted under 35 U.S.C. 154(b) by 145 days.

(21) Appl. No.: 15/674,863

(22) Filed: Aug. 11, 2017

(65) Prior Publication Data
US 2018/0061271 A1 Mar. 1, 2018

Related U.S. Application Data

(63) Continuation of application No. PCT/US2016/017698, filed on Feb. 12, 2016.
(Continued)

(51) Int. Cl.
*G09B 19/02* (2006.01)
*G06F 3/01* (2006.01)
(Continued)

(52) U.S. Cl.
CPC ............ *G09B 19/025* (2013.01); *G06F 3/011* (2013.01); *G06F 3/014* (2013.01); *G06F 3/017* (2013.01);
(Continued)

(58) Field of Classification Search
CPC .................................................. G09B 19/025
See application file for complete search history.

(56) References Cited

U.S. PATENT DOCUMENTS

2002/0010390 A1 1/2002 Guice et al.
2003/0086521 A1* 5/2003 Rana ...................... A44C 23/00
377/3
(Continued)

FOREIGN PATENT DOCUMENTS

WO WO-2009032375 A1 3/2009
WO WO-2016130890 A1 8/2016

OTHER PUBLICATIONS

McGurrin, Mike; Filtering Noise from Sensor Readings: A Simple Low Pass Filter; Jan. 6, 2013; The Aspiring Robotocist; https://www.mcgurrin.info/robots/154/; (Year: 2013).*

(Continued)

*Primary Examiner* — Thomas J Hong
(74) *Attorney, Agent, or Firm* — Schwegman Lundberg & Woessner, P.A.

(57) ABSTRACT

Systems and techniques for assaying conformance to an activity manipulating a beaded-string smart device are herein described. The beaded-string smart device may include an active bead. The active bead may include at least one processor, at least one sensor, and at least one output device. A set of parameters for a model of the activity may be received to establish a measurable metric for at least a portion of the activity. A set of motion data may be collected. A position of the active bead may be calculated in relation to the remainder of the smart device using the set of motion data. The position of the active bead may be compared to the measurable metric to establish progress of the activity. A perceptible output of the progress may be provided via the at least one output device.

21 Claims, 11 Drawing Sheets

Related U.S. Application Data

(60) Provisional application No. 62/115,760, filed on Feb. 13, 2015.

(51) Int. Cl.
 *G06F 3/0487* (2013.01)
 *G09B 5/02* (2006.01)
 *H04M 1/725* (2006.01)

(52) U.S. Cl.
 CPC ............ *G06F 3/0487* (2013.01); *G09B 5/02* (2013.01); *H04M 1/7253* (2013.01)

(56) References Cited

U.S. PATENT DOCUMENTS

| | | | |
|---|---|---|---|
| 2008/0070211 A1* | 3/2008 | DeToma | A44C 15/0015 434/245 |
| 2008/0094472 A1* | 4/2008 | Ayer | A63B 24/0003 348/157 |
| 2010/0035688 A1* | 2/2010 | Picunko | A43B 3/0005 463/39 |
| 2011/0140929 A1* | 6/2011 | Naya | A61B 5/1128 341/20 |
| 2012/0094814 A1* | 4/2012 | Atkins | A61B 5/486 482/142 |
| 2012/0268592 A1* | 10/2012 | Aragones | G06F 19/3481 348/143 |
| 2013/0216065 A1 | 8/2013 | Nguyen | |
| 2013/0231574 A1 | 9/2013 | Tran | |
| 2014/0290332 A1* | 10/2014 | Yamashita | A63B 69/36 73/11.01 |
| 2014/0349256 A1 | 11/2014 | Connor | |
| 2015/0005911 A1* | 1/2015 | Lake, II | G06Q 50/22 700/91 |
| 2015/0077234 A1* | 3/2015 | Fullam | H05K 1/18 340/407.1 |
| 2016/0092707 A1* | 3/2016 | Madkour | G09B 19/00 340/10.1 |
| 2016/0117006 A1* | 4/2016 | Lehtiniemi | G06F 3/0362 345/173 |
| 2016/0199693 A1* | 7/2016 | Vermilyea | A61B 5/6831 700/91 |
| 2017/0011527 A1* | 1/2017 | Matsunaga | G06K 9/00342 |
| 2019/0029375 A1* | 1/2019 | Lin | G06C 1/00 |
| 2019/0060735 A1* | 2/2019 | Wu | A63B 69/3658 |

OTHER PUBLICATIONS

"International Application Serial No. PCT/US2016/017698 Written Opinion dated Jun. 3, 2016", 7 pgs.

"International Application Serial No. PCT/US2016/017698, International Preliminary Report on Patentability dated Aug. 24, 2017", 9 pgs.

"International Application Serial No. PCT/US2016/017698, International Seah Report dated Jun. 3, 2016", 3 pgs.

"SmartMat: Interactive In-home Yoga", [Online]. Retrieved from the Internet: <URL:http://www.smartmat.com/>, (Accessed Feb. 11, 2015), 14 pgs.

* cited by examiner

US 10,861,349 B2

POSITIONAL ANALYSIS FOR PRAYER RECOGNITION

RELATED APPLICATIONS

This application is a continuation under 35 U.S.C. 111(a) from International Application No. PCT/US2016/017698, filed Feb. 12, 2016, which claims the benefit of priority to U.S. Provisional Application Ser. No. 62/115,760, filed Feb. 13, 2015, which are incorporated herein by reference in their entirety.

TECHNICAL FIELD

Embodiments described herein generally relate to smart prayer devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Spiritual individuals may strive to improve on their spiritual activities. However, as with many aspects of life, it may be difficult to improve in an area without creating benchmarks, doing comparisons, recognizing your current habits, creating/executing a plan to improve your current habits and thereafter monitoring your new habits to detect if improvements were achieved. In order to be able to improve one's spiritual activities, gathering spiritual activity data is important.

Religious practice may include a prayer session. The prayer session may include a sequence of verbal and non-verbal activities (e.g., chanting, bowing, etc.). The prayer session may include repeating one or more sequences for a period of time or for a specific count (e.g., such as when using a rosary). While conducting a prayer session a person may lose track of his place in the prayer sequence or may desire to improve the adherence to the proper form of the prayer sequence or a component thereof (e.g., the entire sequence, a particular physical movement, a chant, etc.).

A prayer accessory may allow the user to collect data to track the progression of the prayer session allowing the user to quickly determine the current step in the sequence as well as allow them to evaluate the overall adherence to the proper form of the prayer sequence and session. For example, a user may wear a wristband, have a device attached to prayer beads (e.g., as an active bead attached to the string, another bead, etc.), or use a special mat that may be communicatively coupled with a smartphone or other device to provide prayer positional tracking and prayer compliance.

Religious practice and motion (e.g., praying, chanting, etc.) is used throughout as an example application of the sensors and techniques described herein. However, other spiritual or bodily activities can also benefit from these devices and techniques. Examples of these activities may include personal development or meditation (e.g., posing, holding, swaying, chants, affirmations, otherwise personally significant movements or utterances, etc.) or exercise (e.g., tabulating repetitions, sit-up motion, etc.).

Figure 1:
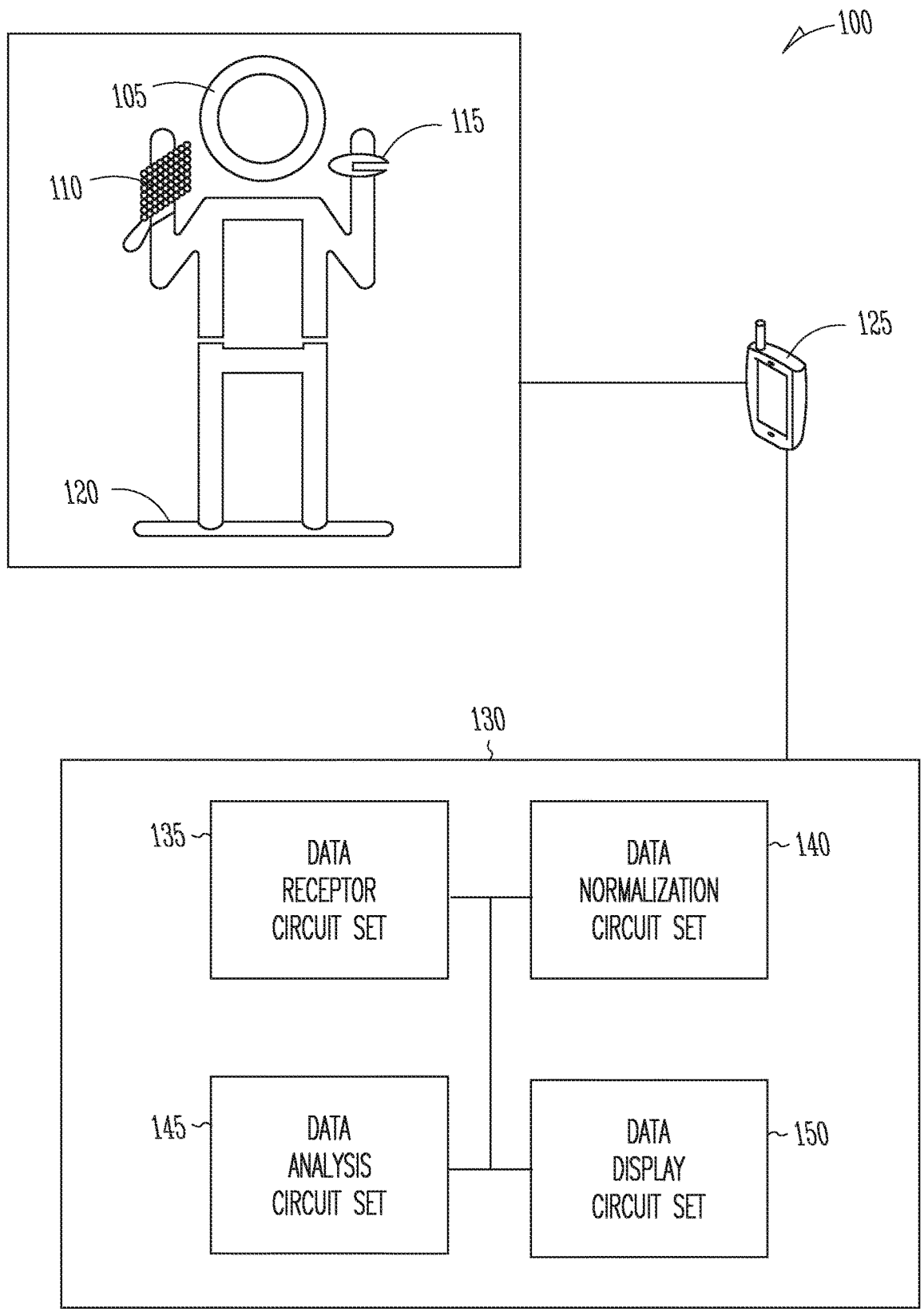
FIG. 1 is a block diagram of an example of an environment including a system for positional analysis for prayer recognition, according to an embodiment.

FIG. 1 is a block diagram of an example of an environment 100 including an intelligent agent system 130 for positional analysis for prayer recognition. The environment 100 may include a user 105 a bead 110 (e.g., attached to prayer beads, etc.), a wristband 115, a mat 120 (e.g., a prayer mat, etc.), and a device 125 (e.g., a smartphone, tablet, etc.) to host the prayer recognition system 130. The prayer recognition system 130 may include a data receptor circuit set (CS) 135, a data normalization CS 140, a data analysis CS 145, and a data display CS 150.

The user may be using the bead 110, the wristband 115, and the mat 120 alone or in combination. Each of the bead 110, the wristband 115, and the mat 120 may contain an array of sensors (e.g., gyroscope, accelerometer, near-field communication transceiver, magnetron, etc.) and may be communicatively coupled to a device 125 via a network (e.g., a wireless network). In an example, the prayer devices may be paired with a smartphone hosting the system 130 via short range radio technology such as, for example, a personal area network (PAN) radio.

The bead 110 may come pre-strung onto a string of prayer beads or may be attached to a string of prayer beads or may be attached to the user's 105 finger. It may be switched on and off by pressing the on/off button. It may be paired with device 125 which may host prayer recognition system 130. There may be various spiritual chanting options that the user 105 may switch between using a button on the bead 110. Other spiritual chanting settings may be set using the prayer recognition system 130 hosted on the paired device 125. A specific chanting option may be selected at which time the counter for that chant may become active. The user 105 may begin a rotation from the head of the prayer beads where the ends of the string meet or by clicking the button on the bead 110. After completing a rotation of the entire string of beads (e.g., moving from the head all the way around the string of beads and back to the head), the bead 110 may detect that the user 105 has completed a rotation of the beads for the active chanting option. For example, the user 105 may begin their rotation starting from the head of the prayer beads and they go around the prayer beads by pulling each bead one-by-one until they return to the head of the prayer beads. The bead 110 may record a single count for each click of the counter button. This data may be stored in the on-board memory of the bead 110.

Periodically, the bead 110 may push its stored data to the prayer recognition system 130 hosted on paired device 125 and may clear its on-board memory. The prayer recognition system 130 may analyze the data and generate useful reports that the user 105 may use to view their spiritual chanting habits over a given period. The user 105 may utilize the reports to learn about their current spiritual chanting habits, benchmark their habits against others, create/execute a plan to improve their current habits and thereafter monitor their new habits to detect if improvements were achieved.

The bead 110 may track the number of rotations of the prayer beads the user 105 makes during a spiritual chanting session for different spiritual chanting options or if used as a counter attached to the user's 105 finger the number of times the counter button is clicked. Upon completion of a round of spiritual chanting the count may reset to zero and prior data may be transmitted or stored before another data collection cycle begins. An LED light in the bead 110 may show the current charge of the battery. For Example, green may mean it has a good charge, amber may mean there is less than 2 days charge remaining, and red may mean there is less than 1 day charge remaining. A charger (e.g., USB, etc.) may be connected (e.g., via a mini-USB dock, etc.) to the bead 110 to recharge the battery.

In some example embodiments the prayer recognition system 130 may receive a set of parameters for a model of an activity to establish a measurable metric for at least a portion of the activity. In an example, the bead 110 may be placed in a training mode and a set of training motion data may be collected from sensor of the bead 110. The model of the activity may be generated using the set of training motion data. Various machine learning or labeling techniques may be employed in generation of the model. For example, the motion data may be manually labeled by a user as a model of motion corresponding to an activity or a machine learning algorithm may compare the set of training data to a set of defined activities and label the training data as one of the predefined activities based on, for example, pattern matching. In an example, the parameters for the model of activity may be received by an input device of the bead 110. In an example, a setup mode graphical user interface may be provided on a display of the bead 110 or of a beaded-string smart device including the bead 110. A set of inputs may be obtained from an interaction with the setup mode graphical user interface and the set of parameters may be derived from the set of inputs.

In some examples, a set of motion data for the bead 110 may be measured via at least one sensor. In an example, the set of motion data may include rotational data and the position may be calculated using the rotational data. For example, the bead 110 may contain a gyroscope and changes in the orientation of the bead 110 may be measured by the gyroscope. In an example, the set of motion data may include acceleration data. For example, the bead 110 may include an accelerometer and changes in acceleration may be measured by the accelerometer. In some examples, a position of the bead 110 in relation to the remainder of the smart device may be calculated using the set of motion data. For example, it may be calculated that the bead 110 is rotating around a fixed point of the smart device and/or may be accelerating toward or away from another point of the smart device. In an example, the set of motion data may be normalized. For example, the data may be normalized to eliminate noise such as normal body movement. In an example, the set of motion data may be normalized by averaging a data element of the set of motion data. For example, the accelerometer data may be averaged over time to minimize outliers.

In some examples, the position of the bead 110 may be compared to the measurable metric to establish progress of the activity. For example, the measurable metric may be a count of times a particular position is observed and the position being observed a third time may be compared to the measurable metric to indicate that the progress of the activity is at a third step in a series of steps indicated for completion of the activity.

In some examples, a perceptible output of the progress may be provided via at least one output device. In an example, the smart device and/or the bead 110 may include a graphical display and the progress may be displayed as text or graphics on the display. In an example, the bead 110 and/or the smart device may include a series of LED lights that may illuminate in differing colors or numbers to indicate progress.

The wristband 115 may be used to detect and record a variety of spiritual activities. Upon setup, the wristband may be paired with the device 125 (e.g., a smartphone) on which there may be hosted the prayer recognition system 130. Periodically, the prayer recognition system 130 may push data to the wristband 115 that is then used by the wristband 115 to generate reminders/notifications about spiritual activities. When the time for a specific spiritual activity approaches the user may get a reminder from the wristband 115. The wristband 115 may detect when the user 105 begins a spiritual activity based on the physical movements of the user 105. Upon detection of the start of a spiritual activity the wristband 115 may put the paired device 125 profile on Silent and may begin recording a series of data points based on the physical movements of the user 105 until it detects the end of the spiritual activity. At the end of the spiritual activity the wristband 115 may return the device 125 to the profile setting it was on before the user 105 started the spiritual activity.

The wristband's 115 stored data may be pushed periodically to prayer recognition system 130 hosted on its paired device 125 and may clear the wristband's 115 on-board memory. The prayer recognition system 130 may analyze the data and transform the data into useful reports that the user 105 can use to view their spiritual activity habits over a given period. The user 105 may utilize the reports to learn about their current spiritual activity habits, benchmark their habits against others, create/execute a plan to improve their current habits and thereafter monitoring their new habits to detect if improvements were achieved. The wristband 115 may allow user 105 to seamlessly and effortlessly capture the user's 105 spiritual activity data that may be utilized to learn about and enhance the user's 105 current spiritual activity habits.

The user 105 may take the wristband and attach it to a smartwatch face. The user 105 may pair the wristband 115 with their device 125. The user 105 may set the various spiritual activity options on device 125 for prayer recognition system 130. When the user 105 is ready to begin their spiritual activity they may set the spiritual activity option to the desired setting by using a spiritual activity button on the wristband 115. When the user 105 engages in the spiritual activity for the spiritual activity option that is currently selected the wristband 115 records the relevant data and this information is stored and pushed to prayer recognition system 130. The user 105 may browse the spiritual activity reports generated by prayer recognition system 130 on their paired device 125 to learn about their current spiritual activity habits, benchmark their habits against others, create/execute a plan to improve their current habits and thereafter monitor their new habits to detect if improvements were achieved.

The mat 120 may be used to detect and record a variety of spiritual activities that the user 105 performs on the mat 120. The mat 120 may include a collection of motion and/or contact sensors (e.g., pressure sensors, capacitive sensors, cameras, infrared sensors, etc.). Upon setup, the mat 120 may be paired with device 125 on which the prayer recognition system 130 may be hosted. Periodically, the prayer recognition system 130 may push data to the mat 120 that may be used by the mat 120 to generate reminders/notifications about spiritual activities. When the time for a specific spiritual activity approaches the user 105 may get a reminder from the mat 120. The mat 120 may detect when the user 105 begins a spiritual activity based on the physical movements of the user 105. Upon detection of the start of a spiritual activity the mat 120 may put the paired device 125 profile on Silent and may begin recording a series of data points based on the physical movements of the user 105 until it detects the end of the spiritual activity. At the end of the spiritual activity the mat 120 returns the device 125 to the profile setting it was on before the user 105 started the spiritual activity.

The mat's 120 stored data may be pushed periodically to the prayer recognition system 130 hosted on its paired device 125 and may clear the mat's 120 on-board memory. The prayer recognition system 130 may analyze the data and may generate useful reports that the user 105 may use to view their spiritual activity habits over a given period. The user 105 may utilize the reports to learn about their current spiritual activity habits, benchmark their habits against others, create/execute a plan to improve their current habits and thereafter monitoring their new habits to detect if improvements were achieved. The mat 120 may allow the user 102 to seamlessly and effortlessly capture their spiritual activity data that they can utilize to learn about and enhance their current spiritual activity habits.

The user 105 may take the mat, unfold it, and switch it on. The user 105 may pair the mat with device 125. The user 105 may set the various spiritual activity options for the prayer recognition system 130 on the device 125. When the user 105 is ready to begin their spiritual activity they may set the spiritual activity option to the desired setting by using the spiritual activity button on the mat 120. When the user 105 engages in the spiritual activity for the spiritual activity option that is currently selected the mat 120 may record the relevant data and this information may be stored and pushed to prayer recognition system 130. The user 105 may browse the spiritual activity reports of the prayer recognition system 130 on the device 125 to learn about their current spiritual activity habits, benchmark their habits against others, create/execute a plan to improve their current habits and thereafter monitor their new habits to detect if improvements were achieved.

The data receptor CS 135 may receive data collected from the array of sensors in the prayer devices. The data from the bead 110, wristband 115, and mat 120 may be pushed, or pulled, periodically to the prayer recognition system 130 hosted on its paired device 125. The data receptor CS 135 will receive the data for entry into the system 130.

The data normalization CS 140 may normalize the data. Normalizing the data may allow the system 130 to account for outlier data points and provide a standard set of data acquired from devices with differing sensor array configurations.

The data analysis CS 145 may analyze the data. In an example, the data analysis CS 145 may learn about the user's 105 current spiritual activity habits, benchmark their habits against others, create/execute a plan to improve their current habits and thereafter monitor their new habits to detect if improvements were achieved based on the data collected. In an example, the data analysis CS 145 may generate reports containing detail of the analysis. In an example, the data analysis CS 145 may generate reminders/notifications about spiritual activities.

The data display CS 150 may display information from the system. In an example, the data display CS 150 may push reminders/notifications about spiritual activities to the bead 110, the wristband 115, and the mat 120. In an example, the data display CS 150 may provide a user interface on the device 125. For example, the user interface may allow the user 105 to select a spiritual activity. For example, the user interface may allow the user 105 to view reports and other data generated by the data analysis CS 145. For example, the user interface may allow the user 105 to configure data collection options for the data receptor CS 135.

Figure 2:
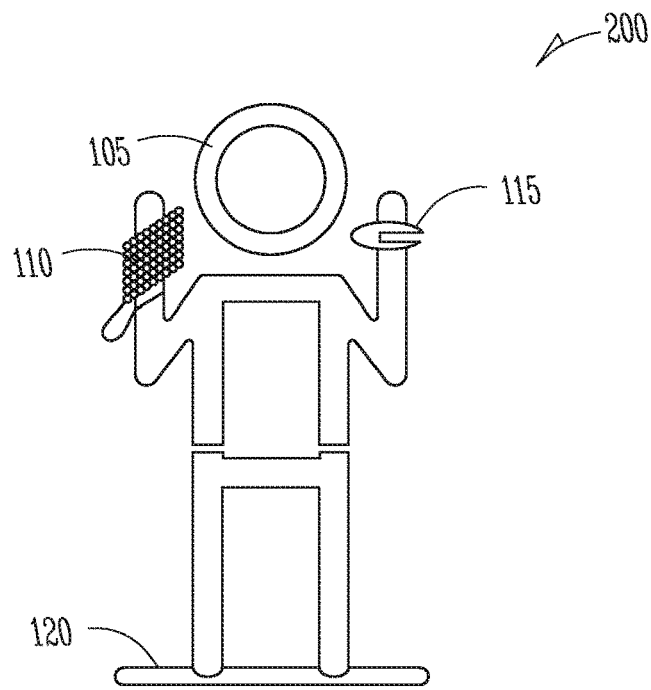
FIG. 2 illustrates an example of three devices configured in relation to a human user for positional analysis for prayer recognition, according to an embodiment.

FIG. 2 illustrates an example of three devices configured in relation to a human user for positional analysis for prayer recognition, according to an embodiment. In an example embodiment a bead 110, a wristband 115, and a mat 120 may be present and configured in relation to a human user 105. The bead 110, the wristband 115, and the mat 120 may be connected to a prayer recognition system similar to that detailed in the description of FIG. 1. For example, a user 105 may place the bead 110 and the mat 120 on the ground and wear the wristband 115. It will be understood that other positional configurations of the devices may be used depending on the specifics of a given prayer and/or other activity to be analyzed.

Figure 3:
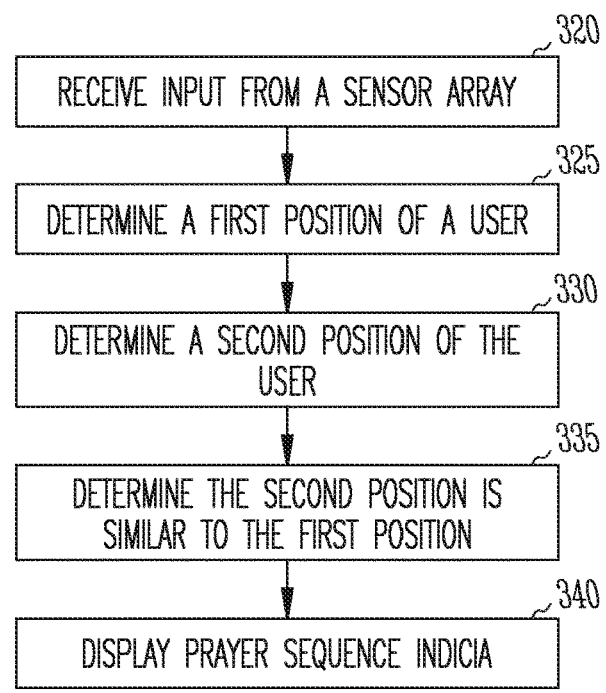
FIG. 3 illustrates a flow diagram of an example of a method for positional analysis for prayer recognition using three devices, according to an embodiment.

FIG. 3 illustrates a flow diagram of an example of a method 300 for positional analysis for prayer recognition using three devices, according to an embodiment. The method may use a three device configuration such as, for example, the configuration described in FIG. 2. At operation 320, input is received from a sensor array. For example, the user may assume the "sujud" position a certain number of times based on the prayer being made. Each time the user assumes the "sujud" position the wristband 115 may be near the bead 110 or the mat 120. At operation 325, a first position of the user is determined. For example, the position may be determined by the proximity of the wristband 115 to the mat 120 or the bead 110. In an example, the proximity may be determined by a near field communications component. In an example, the first position may be determined based on the interaction of a first pair of the set including the bead 110, the wristband 115, and the mat 120. At operation 330, a second position of the user is determined. For example, the next "sujud" position may be identified. In an example, the second position may be determined based on the interaction of a second pair of the set of the bead 110, the wristband 115 and the mat 120. At operation 335, the similarity of the second position to the first position is determined. For example, the first determined position of "sujud" may be found to be similar to the second "sujud" position. At operation 340, prayer sequence indicium is displayed to the user. In an example, the wristband 115 may vibrate, light up, or make a sound when a position is determined. For example, the count of completed "sujud" positions may cause the display of a completion message. In an example, a prayer may be determined based on the number of positions recorded, a time of day, another prayer recorded, and a schedule of prayers for the day. In an example, the schedule of prayers may be determined by the position of the sun at a particular time for the day for the geographical area of the user and device. For example, the five daily prayers and additional prayers for Muslims occur on a regular schedule each day based on the position of the sun and the moon in the sky. Calendars are issued annually precisely describing the moment a prayer time begins for every major city on earth.

The operations of the method 300 can also be applied in a more general manner when, for example, an active bead is affixed to a beaded-smart device. For example, the beaded-string smart device may include an active bead, the active bead may include at least one processor, at least one sensor, and at least one output device. The method 300 may determine conformance to an activity manipulating the beaded-string smart device. A set of parameters for a model of the activity may be received by the active bead to establish a measurable metric for at least a portion of the activity. A set of motion data may be produced via the at least one sensor for the active bead. In an example, the set of motion data may include rotational data. In an example, the set of motion data may include acceleration data. In an example, the set of motion data may be normalized. In an example, normalizing the set of motion data may include averaging a data element of the set of motion data. A position of the active bead in relation to the remainder of the smart device may be calculated by the at least one processor using the set of motion data. In an example, the position may be calculated using the rotational data. In an example, the position may be calculated using the accelerometer data. In an example, the position may be calculated using the normalized data. The position of the active bead may be compared to the measurable metric using the at least one processor to establish progress of the activity. A perceptible output of the progress may be provided via the at least one output device.

In some examples, the set of parameters may be received via an input device of the active bead. In an example, the input device may include a display and receiving the set of parameters may include providing a setup mode graphical user interface on the display. In an example, a set of inputs may be obtained from an interaction with the setup mode graphical user interface and the set of parameters may be derived from the set of inputs.

In some examples, a training mode may be initiated via the beaded-string smart device. A set of training motion data may be collected via the at least one sensor and the model of the activity may be generated using the set of training motion data. For example, the user 105 may place the beaded-string smart device in training mode and may conduct a series of motions corresponding to an activity. For example, the user may conduct a series of motions corresponding to a specific prayer sequence. The training motion data may then be collected as an activity model. The model may then be labeled as an activity. Other training techniques may be employed such as, for example, machine learning techniques. For example, a variety of supervise, unsupervised, and hybrid machine learning techniques may be employed to develop models of activities. In some examples, machine learning may be used to adapt a model of an activity for the user 105. For example, if a user has a physical disability, a machine learning algorithm may be used to adapt a model to the physical constraints of the user 105.

Figure 4:
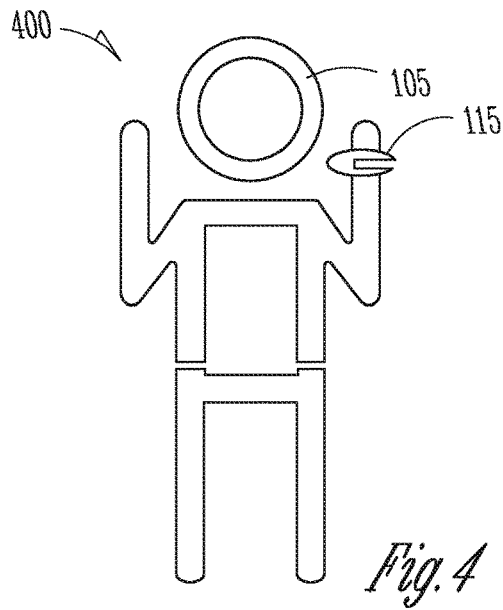
FIG. 4 illustrates an example of a single device configured in relation to a human user for positional analysis for prayer recognition, according to an embodiment.

FIG. 4 illustrates an example of a single device configured in relation to a human user for positional analysis for prayer recognition, according to an embodiment. In an example embodiment a wristband 115 may be present and configured in relation to a human user 105. The wristband 115 may be connected to a prayer recognition system similar to that detailed in the description of FIG. 1. For example, a user may wear the wristband 105 around one wrist. It will be understood that the wristband 115 may be placed in other positions in relation to the human user 105 depending on the specifics of the prayer and/or activity to be analyzed.

Figure 5:
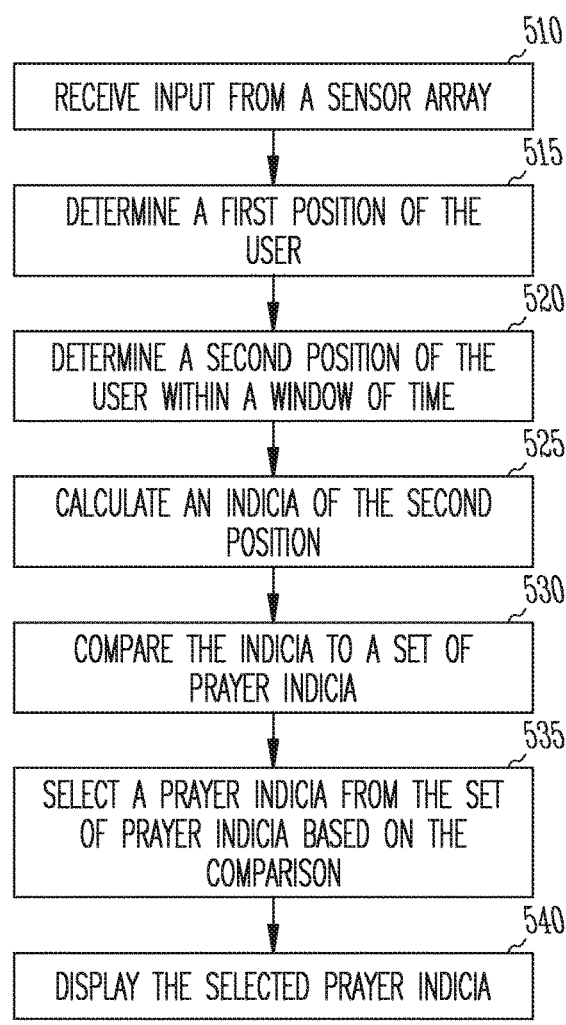
FIG. 5 illustrates a flow diagram of an example of a method for positional analysis for prayer recognition using a single device, according to an embodiment.

FIG. 5 illustrates a flow diagram of an example of a method for positional analysis for prayer recognition using a single device, according to an embodiment. The method may use a single device configuration such as, for example, the configuration described in FIG. 4. At operation 510, input is received from a sensor array. In an example, the wristband 115 may be in sleep mode until a positon is determined. In an example, the wristband 115 may contain an accelerometer and a magnetometer. At operation 515 a first position of a user is determined. In an example, the wristband 115 may be in sleep mode until a positon is determined. For example, a step raise and lowering of the hands may determine the first position. At operation 520 a second position of the user is determined within a window of time. For example, a second steep raise of the hands may determine the second position if received within 2 minutes. At operation 525, indicia of the second position are calculated. For example, the positional information of the movement of the hands may be calculated. At operation 530 the indicia is compared to a set of prayer indicia. For example, the set of prayer indicia may include indicia of "Salah" mode as well as prayers to be completed based on the time of day. For example, the set of prayer indicia may include indicia for the five Muslim prayers. At operation 535, a prayer is selected from the set of prayer indicia based on the comparison. For example, the proper prayer for the time of day may be selected. At operation 540, the selected prayer indicium is displayed. In an example, the wristband 115 confirms the prayer being prayed by the number of calculated positions. For example, the prayer being prayed may be confirmed by the number of hand raises recognized within the prayer. The operations of the method 500 can also be applied in a more general manner, for example, as described in FIG. 3.

Figure 6:
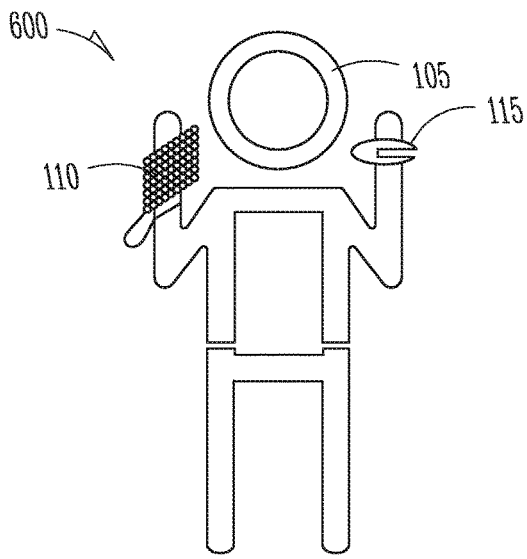
FIG. 6 illustrates an example of two devices configured in relation to a human user for positional analysis for prayer recognition, according to an embodiment.

FIG. 6 illustrates an example of two devices configured in relation to a human user for positional analysis for prayer recognition, according to an embodiment. In an example embodiment a bead 110 and a wristband 115 may be present and configured in relation to a human user 105. The bead 110 and the wristband 115 may be connected to a prayer recognition system similar to that detailed in the description of FIG. 1. For example, a user may wear the bead 110 on one wrist and the wristband 115 on the other wrist. The user may initiate "Salah" prayer mode for the bead 110 and wristband 115. The bead 110 and the wristband 115 may include a sensor array including accelerometers. In an example, the bead 110 and wristband 115 may be connected via short-wave radio (e.g., Bluetooth, etc.). In an example, the bead 110 and the wristband 115 may include near filed communication (NFC) transceivers. It will be understood that the bead 110 and the wristband 115 may be placed in other positions in relation to the human user 105 depending on the specifics of a given prayer and/or activity to be analyzed.

Figure 7:
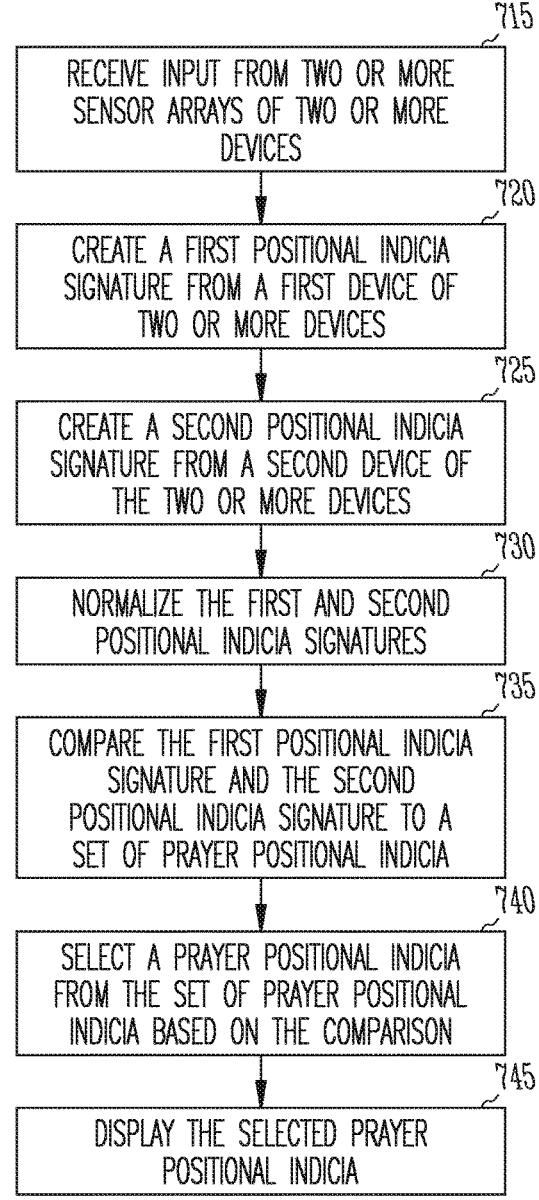
FIG. 7 illustrates a flow diagram of an example of a method for positional analysis for prayer recognition using two devices, according to an embodiment.

FIG. 7 illustrates a flow diagram of an example of a method for positional analysis for prayer recognition using two devices, according to an embodiment. The method may use a two device configuration such as, for example, the configuration described in FIG. 6. At operation 715, input is received from two or more sensor arrays in two or more devices. In an example, readings from the sensor arrays are taken every few milliseconds. In an example, additional data may be received from near field communication transceivers in the two or more devices. For example, hands covering each other during the "al-qiyyam" position may be detected by NFC. For example, when the two or more devices touch or come within one inch NFC may confirm a "takbir" position event. At operation 720, a first positional indicia signature from a first device of the two or more devices is created. At operation 725, a second positional indicia signature from a second device of the two or more devices is created. At operation 730, the first and second positional indicia signatures are normalized. In an example, the data is normalized by using a processing filter. At operation 735, the first positional indicia signature and the second positional indicia signature are compared to a set of prayer positional indicia. At operation 740, prayer positional indicia are selected from the set of prayer positional indicia based on the comparison. For example, approximately matched readings may indicate a "Salah" event. At operation 745, the selected prayer positional indicia are displayed. The operations of the method 700 can also be applied in a more general manner, for example, as described in FIG. 3.

Figure 8:
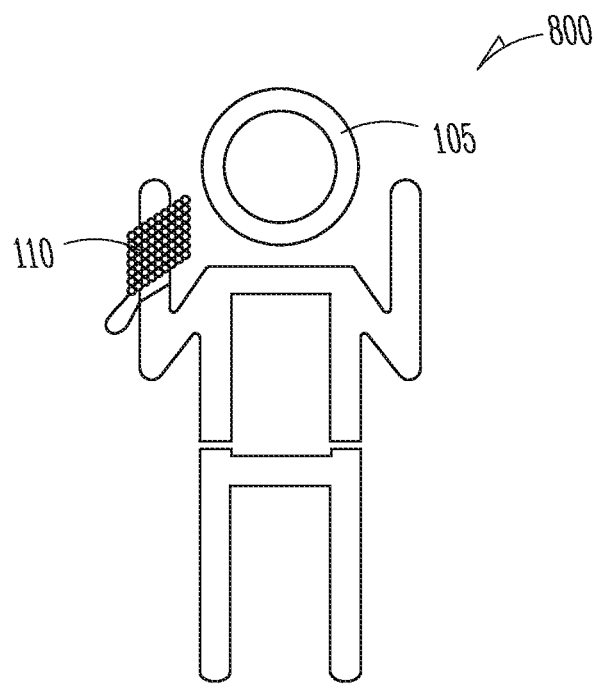
FIG. 8 illustrates an example of a single device configured in relation to a human user for positional analysis for prayer recognition, according to an embodiment.

FIG. 8 illustrates an example of a single device configured in relation to a human user for positional analysis for prayer recognition, according to an embodiment. In an example embodiment a bead 110 may be present and configured in relation to a human user 105. The bead 110 may be connected to a prayer recognition system similar to that detailed in the description of FIG. 1. For example, a user may be wearing the bead 110 on a wrist. It will be understood that the bead 110 may be placed in other positions in relation to the human user 105 depending on the specifics of a given prayer and/or activity to be analyzed.

Figure 9:
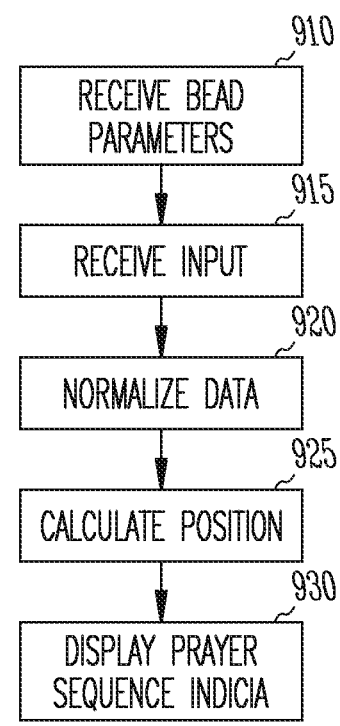
FIG. 9 illustrates a flow diagram of an example of a method for positional analysis for prayer recognition using a single device, according to an embodiment.

FIG. 9 illustrates a flow diagram of an example of a method for positional analysis for prayer recognition using a single device, according to an embodiment. The method may use a single device configuration such as, for example, the single device configuration described in FIG. 8. At operation 910, bead parameters are received. For example, the user may initiate setup mode from within a user interface of the prayer recognition system. The user then may input the number of beads on a set of prayer beads. At operation 915, input is received. For example, the user may begin counting through the beads for nine rounds representing the three major prayers said while rotating the beads. A microprocessor may register the time each rotation took. For example, other normalization techniques may be employed.

At operation 925 a position is calculated. In an example, the microprocessor may register the highest impact measured by the accelerometer at the beginning, middle, and end of each round where in the bead is directly contacted at the beginning and ends of each round and furthest from the user's thumb in the middle of the round, as measured by the amount of time the round takes. At operation 920, data is normalized. For example, the data may be averaged. At operation 930, prayer sequence indicia are displayed. In an example, the prayer sequence indicia may be displayed based on the prayer mode and the time of day. The operations of the method 900 can also be applied in a more general manner, for example, as described in FIG. 3.

Figure 10:
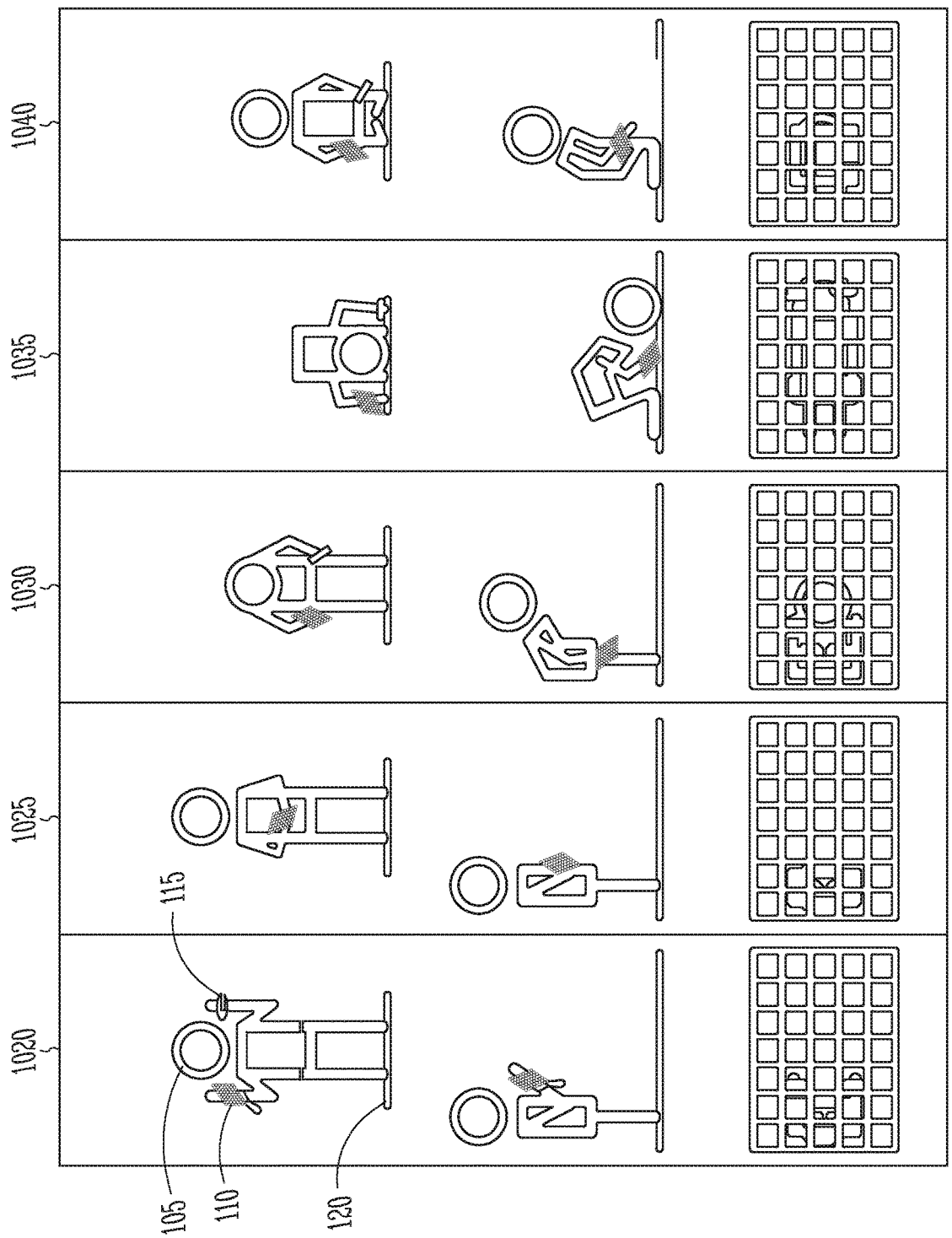
FIG. 10 illustrates an example of an environment for positional analysis for prayer recognition, according to an embodiment.

FIG. 10 illustrates a block diagram of an example of an environment 1000 for positional analysis for prayer recognition, according to an embodiment. In an example embodiment a bead 105, wristband 110, and mat 115 may be present and connected to the prayer recognition system element similar to that detailed in the description of FIG. 1. While participating in a prayer session the user may practice several positions (e.g., elements 1020-1040). For example, Muslim prayer includes positions Takbir 1020, Al-Qiyyam 1025, Ruku 1030, Sujud 1035, and Julus 1040. The user will progress through these positions during a prayer session. Each position has unique characteristics that may be captured by analysis of data collected from sensor arrays in the bead 105, wristband 110, and mat 115 as described above in FIGS. 1-9. For example, each of the 5 positions occurs multiple times in the same order every time, beginning in "takbir" and ending in "julus". The repetitive occurrences of the "Takbir", "Al-Qiyyam", and "Sujud" positions may allow data points to be collected for positional analysis. It should be noted that many positions could be used to achieve this effect, so long as the positions are repetitive or predictable.

Figure 11:
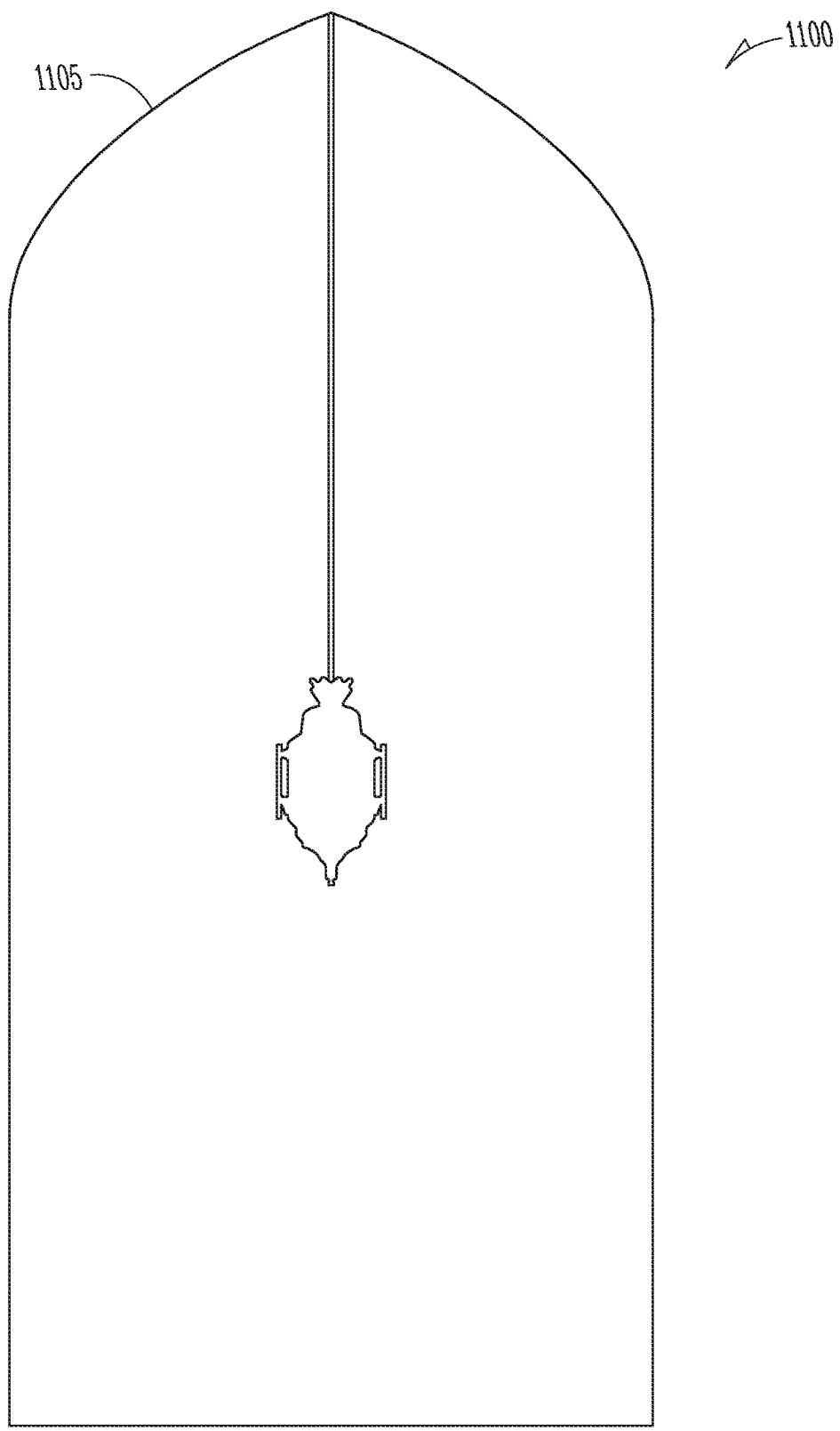
FIG. 11 illustrates an example of a device for positional analysis for prayer recognition, according to an embodiment.

FIG. 11 illustrates an example of a device 1100 for positional analysis for prayer recognition, according to an embodiment. A mat 1105 may be present and connected to the prayer recognition system element similar to that detailed in the description of FIG. 1. A user may perform spiritual activities on the mat 1105. The mat 1105 may include devices to detect movement. In an example, the mat 1105 may include a spiritual activity option button. In an example, the mat 1105 may include an LED display. In an example, the mat 1105 may include an on/off button. In an example, the mat 1105 may include a rechargeable battery. In an example, the mat 1105 may include an LED light to show the current battery charge. In an example, the mat 1105 may include a mini-USB dock for connecting a USB charger for recharging the battery.

Figure 13:
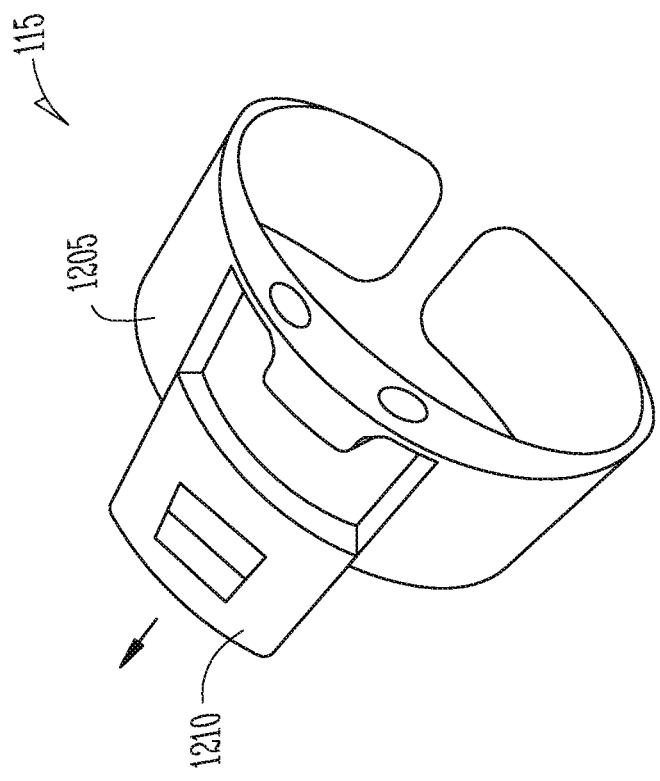
FIGS. 12 & 13 illustrate an example of a device for positional analysis for prayer recognition, according to an embodiment.
Figure 12:
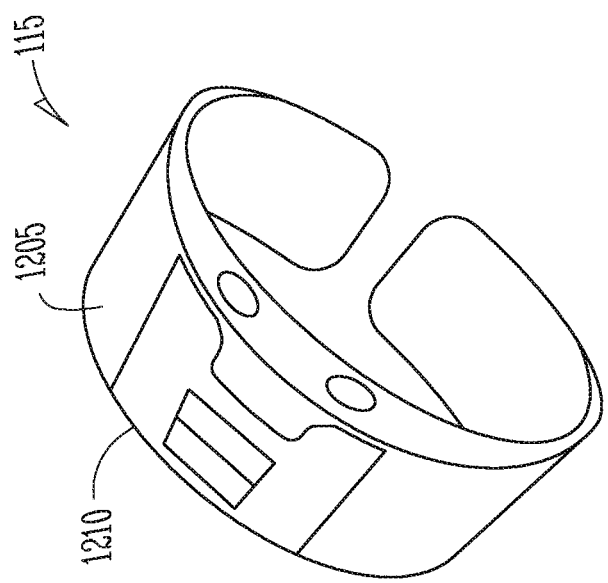

FIGS. 12 & 13 illustrate examples of a device 115 for positional analysis for prayer recognition, according to an embodiment. A wristband 1205 may be present and connected to the prayer recognition system element similar to that detailed in the description of FIG. 1. In an example, such as FIG. 12, the wristband 1205 may attach to a smartwatch face 1210 and may contain a connection point to attach the smartwatch face 1210. In the wristband 1205 there may be devices to detect movement. In an example, the wristband 1205 may include a spiritual activity option button and may include a display (e.g., LED display, etc.). In an example, the wristband 1205 may be powered by the battery of the smartwatch face 1210. In some examples, such as shown in FIG. 13, the wristband 1205 may be detachable from the smartwatch face 1210. In some examples, the smartwatch face 1210 may be dockable for charging or data transfer. In some examples, the smartwatch face 1210 may be interchangeable with other wristbands.

Figure 14:
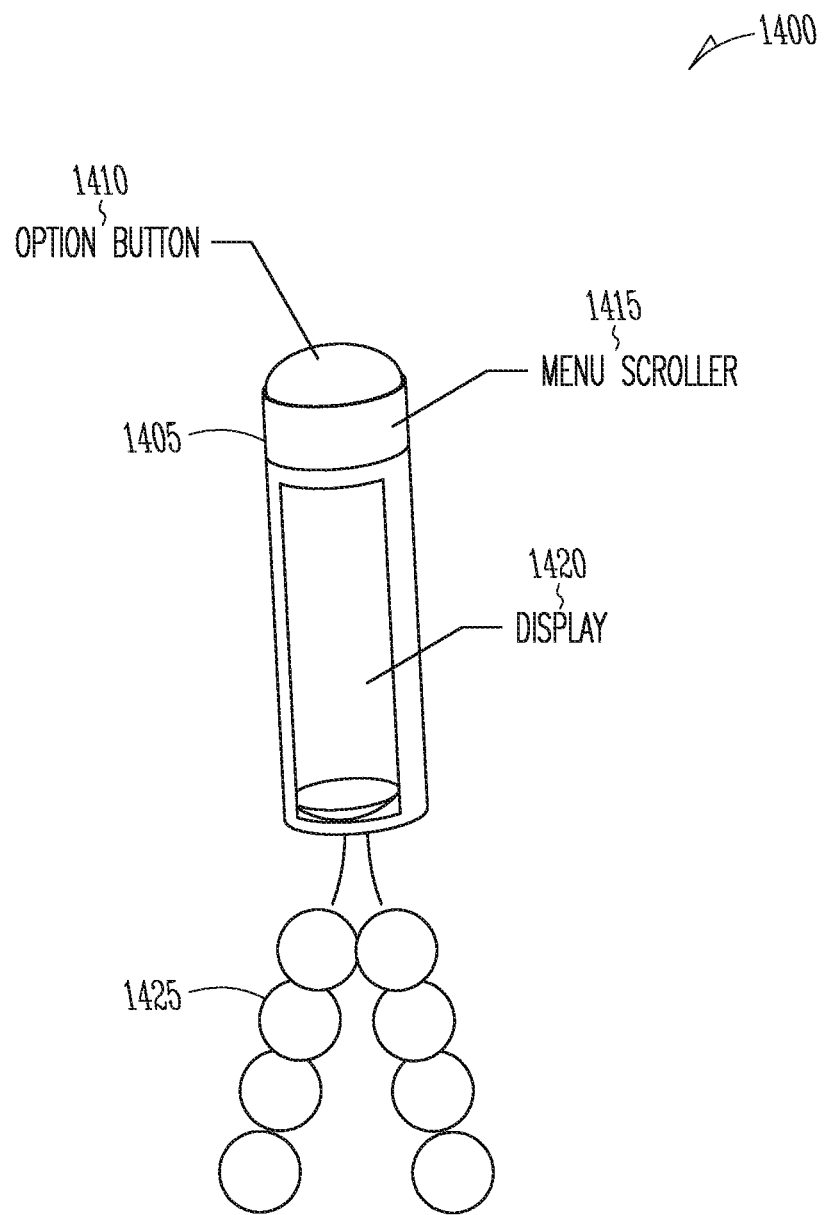
FIG. 14 illustrates an example of a device for positional analysis for prayer recognition, according to an embodiment.

FIG. 14 illustrates an example of a device 1400 for positional analysis for prayer recognition, according to an embodiment. A bead 1405 may be present and connected to the prayer recognition system element similar to that detailed in the description of FIG. 1. The bead 1405 may, without limitation, have an option button 1410, menu scroller 1415, and Display (e.g., LED screen) 1420. It will be appreciated that the bead 1405 may have several different configurations of which device 1400 is one example embodiment. The bead 1405 may be connected to the end of a string of beads (e.g., prayer beads) 1425. The bead may also be attached to other prayer accessories or may be attached to a user's finger. In an example, the option button 1410 may be used to toggle between different spiritual chanting options. In an example, the bead 1405 may include an on/off button. In an example, the bead 1405 may include a count button. In an example, the bead 1405 may include a rechargeable battery. In an example, the bead 1405 may include an LED light to show the current battery charge. In an example, the bead 1405 may include a mini-USB dock for connecting a USB charger for recharging the battery.

Figure 15:
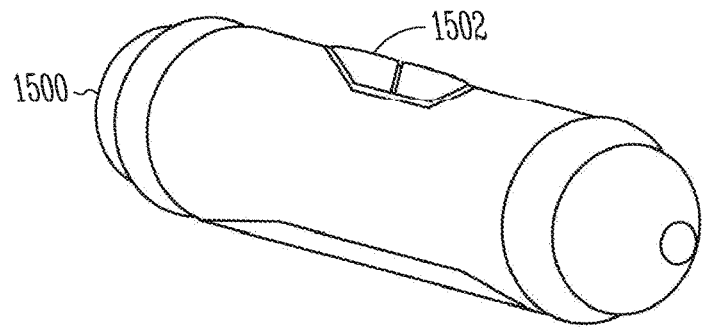
FIGS. 15, 16 and 17 illustrate examples of devices.
Figure 16:
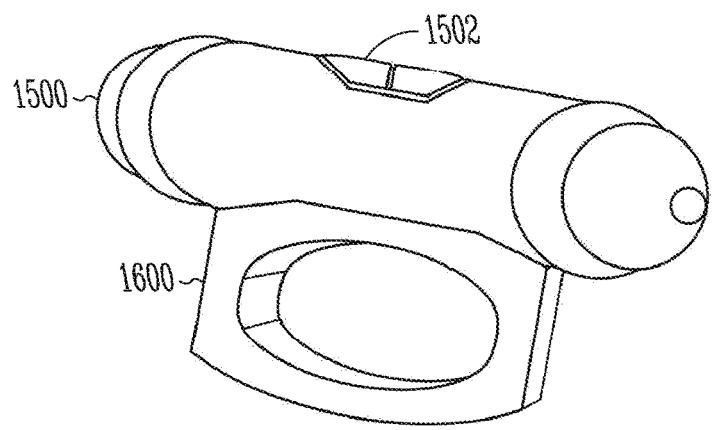
Figure 17:
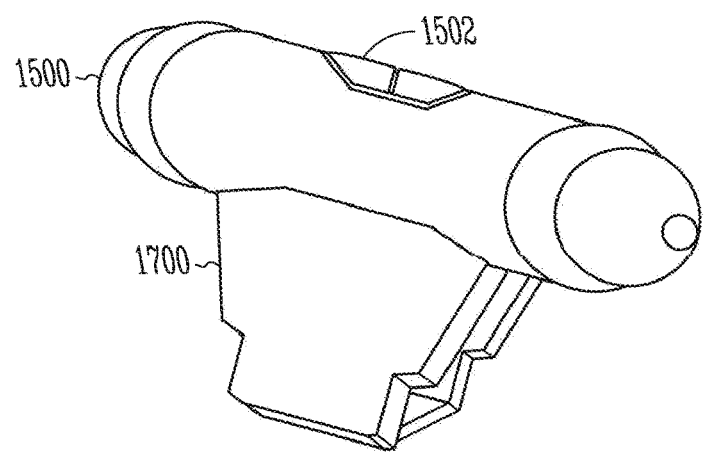

FIGS. 15-17 illustrate examples of devices. FIG. 15 illustrates a device 1500 with integrated physical user interface 1502. Here the integrated physical user interface 1502 includes a plurality of buttons, but other interfaces, such as a touch interface, dial, knob, slider, etc. may be used. The physical user interface 1502 may be used to turn on, setup, or otherwise permit the user to interact with the device 1500. For example, one of the illustrated buttons may increment a count (e.g., of a repitious activity) while the other button resets the count.

In an example, the device 1500 may include a clip, caribiner, etc. to attach the device 1500 to a string, clothing, etc. FIG. 16 illustrates a variation in which the device 1500 includes a perpendicular ring 1600 affixed to the housing of the device 1500. The perpendicular ring 1600 permits a user to where the device 1500 on a finger, the device 1500 being orthoganal to the finger. FIG. 17 includes another variation that includes a parallel ring 1700. Again, a user may then were the device 1500 on a finger, here the device 1500 being parallel with the finger. In an example, the ring 1600 or 1700 may be attached to the device 1500 with a pivot, such that, for example, the perpendicular ring 1600 can be rotated a quarter turn to be the parallel ring 1700 (and back again). The pivot may include a locking mechanism to hold the user designated orientation of the ring.

Figure 18:
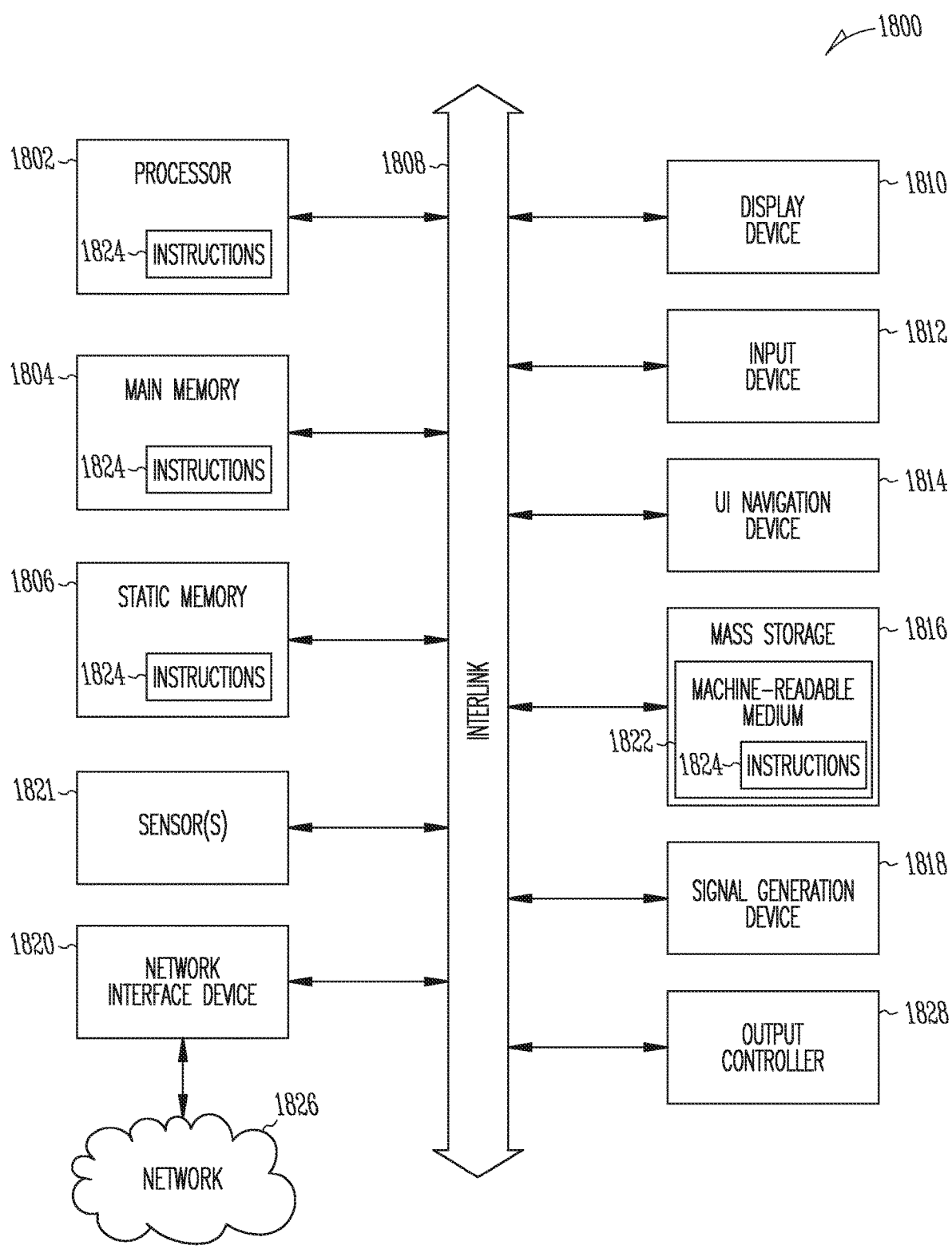
FIG. 18 is a block diagram illustrating an example of a machine upon which one or more embodiments may be implemented.

FIG. 18 illustrates a block diagram of an example machine 1800 upon which any one or more of the techniques (e.g., methodologies) discussed herein may perform. In alternative embodiments, the machine 1800 may operate as a standalone device or may be connected (e.g., networked) to other machines. In a networked deployment, the machine 1800 may operate in the capacity of a server machine, a client machine, or both in server-client network environments. In an example, the machine 1800 may act as a peer machine in peer-to-peer (P2P) (or other distributed) network environment. The machine 1800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1800 may include a hardware processor 1802 (e.g., a central processing unit (CPU), a graphics processing unit (GPU), a hardware processor core, or any combination thereof), a main memory 1804 and a static memory 1806, some or all of which may communicate with each other via an interlink (e.g., bus) 1808. The machine 1800 may further include a display unit 1810, an alphanumeric input device 1812 (e.g., a keyboard), and a user interface (UI) navigation device 1814 (e.g., a mouse). In an example, the display unit 1810, input device 1812 and UI navigation device 1814 may be a touch screen display. The machine 1800 may additionally include a storage device (e.g., drive unit) 1816, a signal generation device 1818 (e.g., a speaker), a network interface device 1820, and one or more sensors 1821, such as a global positioning system (GPS) sensor, compass, accelerometer, or other sensor. The machine 1800 may include an output controller 1828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1816 may include a machine readable medium 1822 on which is stored one or more sets of data structures or instructions 1824 (e.g., software) embodying or utilized by any one or more of the techniques or functions described herein. The instructions 1824 may also reside, completely or at least partially, within the main memory 1804, within static memory 1806, or within the hardware processor 1802 during execution thereof by the machine 1800. In an example, one or any combination of the hardware processor 1802, the main memory 1804, the static memory 1806, or the storage device 1816 may constitute machine readable media.

While the machine readable medium 1822 is illustrated as a single medium, the term "machine readable medium" may include a single medium or multiple media (e.g., a centralized or distributed database, and/or associated caches and servers) configured to store the one or more instructions 1824.

The term "machine readable medium" may include any medium that is capable of storing, encoding, or carrying instructions for execution by the machine 1800 and that cause the machine 1800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1824 may further be transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1800, and includes digital or analog communications signals or other intangible medium to facilitate communication of such software.

Additional Notes & Examples

Example 1 is an active bead for a beaded-string smart device, the active bead comprising: a housing including a fastener to attach the active bead to the beaded-string smart device; at least one processor; at least one sensor; at least one output device; and a memory including instructions that, when executed by the at least one processor, cause the active bead to: receive a set of parameters for a model of the activity to establish a measurable metric for at least a portion of the activity; measure, via the at least one sensor, a set of motion data for the active bead; calculate, using the at least one processor, a position of the active bead in relation to the remainder of the smart device using the set of motion data; compare, using the at least one processor, the position of the active bead to the measurable metric to establish progress of the activity; and provide a perceptible output of the progress via the at least one output device.

In Example 2, the subject matter of Example 1 optionally includes, further comprising: an input device, wherein the instructions further cause the active bead to receive the set of parameters via the input device.

In Example 3, the subject matter of Example 2 optionally includes, further comprising a display, wherein the instructions to receive the set of parameters cause the active bead to: provide a setup mode graphical user interface on the display; and obtain a set of inputs from an interaction with the setup mode graphical user interface the set of parameters derived from the set of inputs.

In Example 4, the subject matter of any one or more of Examples 1-3 optionally include, further including instructions which, when executed by the at least one processor, cause the beaded-string smart device to: initiate, via the beaded-string smart device, a training mode; collect, via the at least one sensor, a set of training motion data; and generate the model of activity using the set of training motion data.

In Example 5, the subject matter of any one or more of Examples 1-4 optionally include, wherein the set of motion data includes rotational data and the position is calculated using the rotational data.

In Example 6, the subject matter of any one or more of Examples 1-5 optionally include, wherein the set of motion data includes acceleration data and the position is calculated using the acceleration data.

In Example 7, the subject matter of any one or more of Examples 1-6 optionally include, wherein the set of motion data is normalized and the position is calculated using the normalized data.

In Example 8, the subject matter of Example 7 optionally includes, wherein normalizing the set of motion data includes averaging a data element of the set of motion data.

Example 9 is a method for assaying conformance to an activity manipulating a beaded-string smart device, the beaded-string smart device including an active bead, the active bead including at least one processor, at least one sensor, and at least one output device, the method comprising: receiving, by the active bead, a set of parameters for a model of the activity to establish a measurable metric for at least a portion of the activity; producing, via the at least one sensor, a set of motion data for the active bead; calculating, using the at least one processor, a position of the active bead in relation to the remainder of the smart device using the set of motion data; comparing, using the at least one processor, the position of the active bead to the measurable metric to establish progress of the activity; and providing a perceptible output of the progress via the at least one output device.

In Example 10, the subject matter of Example 9 optionally includes, wherein receiving the set of parameters includes receiving the set of parameters via an input device of the active bead.

In Example 11, the subject matter of Example 10 optionally includes, wherein the input device includes a display, and where receiving the set of parameters includes: providing a setup mode graphical user interface on the display; and obtaining a set of inputs from an interaction with the setup mode graphical user interface, the set of parameters derived from the set of inputs.

In Example 12, the subject matter of any one or more of Examples 9-11 optionally include, further comprising: initiating, via the beaded-string smart device, a training mode; collecting, via the at least one sensor, a set of training motion data; and generating the model of the activity using the set of training motion data.

In Example 13, the subject matter of any one or more of Examples 9-12 optionally include, wherein the set of motion data includes rotational data and the position is calculated using the rotational data.

In Example 14, the subject matter of any one or more of Examples 9-13 optionally include, wherein the set of motion data includes acceleration data and the position is calculated using the acceleration data.

In Example 15, the subject matter of any one or more of Examples 9-14 optionally include, wherein the set of motion data is normalized and the position is calculated using the normalized data.

In Example 16, the subject matter of Example 15 optionally includes, wherein normalizing the set of motion data includes averaging a data element of the set of motion data.

Example 17 is a computer readable medium including instructions for assaying conformance to an activity manipulating a beaded-string smart device, the instructions, when executed by a machine, cause the machine to perform operations comprising: receiving, by the active bead, a set of parameters for a model of the activity to establish a measurable metric for at least a portion of the activity; producing, via the at least one sensor, a set of motion data for the active bead; calculating, using the at least one processor, a position of the active bead in relation to the remainder of the smart device using the set of motion data; comparing, using the at least one processor, the position of the active bead to the measurable metric to establish progress of the activity; and providing a perceptible output of the progress via the at least one output device.

In Example 18, the subject matter of Example 17 optionally includes, wherein receiving the set of parameters includes receiving the set of parameters via an input device of the active bead.

In Example 19, the subject matter of Example 18 optionally includes, wherein the input device includes a display, and where receiving the set of parameters includes: providing a setup mode graphical user interface on the display; and obtaining a set of inputs from an interaction with the setup mode graphical user interface, the set of parameters derived from the set of inputs.

In Example 20, the subject matter of any one or more of Examples 17-19 optionally include, further comprising: initiating, via the beaded-string smart device, a training mode; collecting, via the at least one sensor, a set of training motion data; and generating the model of the activity using the set of training motion data.

In Example 21, the subject matter of any one or more of Examples 17-20 optionally include, wherein the set of motion data includes rotational data and the position is calculated using the rotational data.

In Example 22, the subject matter of any one or more of Examples 17-21 optionally include, wherein the set of motion data includes acceleration data and the position is calculated using the acceleration data.

In Example 23, the subject matter of any one or more of Examples 17-22 optionally include, wherein the set of motion data is normalized and the position is calculated using the normalized data.

In Example 24, the subject matter of Example 23 optionally includes, wherein normalizing the set of motion data includes averaging a data element of the set of motion data.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An active bead for a beaded-string smart device, the active bead comprising:
    a housing including a fastener to attach the active bead to the beaded-string smart device, wherein the beaded-string smart device includes a plurality of beads;
    at least one processor;
    at least one sensor; and
    a memory including instructions that, when executed by the at least one processor, cause the active bead to:
        receive a set of parameters for a model of an activity to establish a measurable metric for at least a portion of the activity;
        measure, via the at least one sensor, a set of motion data for the active bead;
        transmit an indication that the activity has started to a wristband device;
        calculate, using the at least one processor, a position of the active bead in relation to a remainder of the plurality of beads of the smart device using the set of motion data wherein the set of motion data includes rotational data of the active bead and the position of the active bead is calculated using the rotational data;
        compare, using the at least one processor, the position of the active bead to the measurable metric to establish progress of the activity;
        transmit the progress to the wristband device; and
        receive an indication the activity is complete, based on the progress, from the wristband device.

2. The active bead of claim 1, further comprising:
    an input device, wherein the instructions further cause the active bead to receive the set of parameters via the input device.

3. The active bead of claim 2, further comprising a display, wherein the instructions to receive the set of parameters cause the active bead to:
    provide a setup mode graphical user interface on the display; and
    obtain a set of inputs from an interaction with the setup mode graphical user interface, wherein the set of parameters are derived from the set of inputs.

4. The active bead of claim 1, further including instructions which, when executed by the at least one processor, cause the beaded-string smart device to:
    initiate, via the beaded-string smart device, a training mode;
    collect, via the at least one sensor, a set of training motion data; and
    generate the model of activity using the set of training motion data.

5. The active bead of claim 1, wherein the set of motion data includes acceleration data and the position is calculated using the acceleration data.

6. The active bead of claim 1, wherein the set of motion data is normalized and the position is calculated using the normalized data.

7. The active bead of claim 6, wherein the set of motion data includes at least one type of motion data and wherein normalizing the set of motion data includes averaging a type of motion data of the set of motion data.

8. A method for assaying conformance to an activity manipulating a beaded-string smart device, the beaded-string smart device including an active bead, the active bead including at least one processor, at least one sensor, and at least one output device, the method comprising:
    receiving, by the active bead of the beaded-string smart device, a set of parameters for a model of the activity to establish a measurable metric for at least a portion of the activity, wherein the beaded-string smart device includes a plurality of beads;
    measuring, via the at least one sensor, a set of motion data for the active bead;
    transmitting an indication that the activity has started to a wristband device;
    calculating, using the at least one processor, a position of the active bead in relation to a remainder of the plurality of beads of the smart device using the set of motion data, wherein the set of motion data includes rotational data of the active bead and the position of the active bead is calculated using the rotational data;
    comparing, using the at least one processor, the position of the active bead to the measurable metric to establish progress of the activity;
    transmitting the progress to the wristband device; and
    receiving an indication the activity is complete, based on the progress, from the wristband device.

9. The method of claim 8, wherein receiving the set of parameters includes receiving the set of parameters via an input device of the active bead.

10. The method of claim 9, wherein the input device includes a display, and where receiving the set of parameters includes:
    providing a setup mode graphical user interface on the display; and
    obtaining a set of inputs from an interaction with the setup mode graphical user interface, the set of parameters derived from the set of inputs.

11. The method of claim 8, further comprising:
    initiating, via the beaded-string smart device, a training mode;
    collecting, via the at least one sensor, a set of training motion data; and
    generating the model of the activity using the set of training motion data.

12. The method of claim 8, wherein the set of motion data includes acceleration data and the position is calculated using the acceleration data.

13. The method of claim 8, wherein the set of motion data is normalized and the position is calculated using the normalized data.

14. The method of claim 13, wherein the set of motion data includes at least one type of motion data and wherein normalizing the set of motion data includes averaging a type of motion data of the set of motion data.

15. A computer readable medium including instructions for assaying conformance to an activity manipulating a beaded-string smart device, the instructions, when executed by a machine, cause the machine to perform operations comprising:
    receiving, by an active bead of the beaded-string smart device, a set of parameters for a model of the activity to establish a measurable metric for at least a portion of the activity, wherein the beaded-string smart device includes a plurality of beads;
    measuring, via the at least one sensor, a set of motion data for the active bead;
    transmitting an indication that the activity has started to a wristband device;
    calculating, using the at least one processor, a position of the active bead in relation to a remainder of the plurality of beads of the smart device using the set of motion data, wherein the set of motion data includes rotational data of the active bead and the position of the active bead is calculated using the rotational data;

comparing, using the at least one processor, the position of the active bead to the measurable metric to establish progress of the activity;

transmitting the progress to the wristband device; and receiving an indication the activity is complete, based on the progress, from the wristband device.

16. The computer readable medium of claim 15, wherein receiving the set of parameters includes receiving the set of parameters via an input device of the active bead.

17. The computer readable medium of claim 16, wherein the input device includes a display, and where receiving the set of parameters includes:

provide a setup mode graphical user interface on the display; and obtaining a set of inputs from an interaction with the setup mode graphical user interface, the set of parameters derived from the set of inputs.

18. The computer readable medium of claim 15, further comprising:

initiating, via the beaded-string smart device, a training mode;

collecting, via the at least one sensor, a set of training motion data; and generating the model of the activity using the set of training motion data.

19. The computer readable medium of claim 15, wherein the set of motion data includes acceleration data and the position is calculated using the acceleration data.

20. The computer readable medium of claim 15, wherein the set of motion data is normalized and the position is calculated using the normalized data.

21. The computer readable medium of claim 20, wherein the set of motion data includes at least one type of motion data and wherein normalizing the set of motion data includes averaging a type of motion data of the set of motion data.

* * * * *

UNITED STATES PATENT AND TRADEMARK OFFICE
CERTIFICATE OF CORRECTION

PATENT NO. : 10,861,349 B2
APPLICATION NO. : 15/674863
DATED : December 8, 2020
INVENTOR(S) : Mohammed et al.

Page 1 of 1

It is certified that error appears in the above-identified patent and that said Letters Patent is hereby corrected as shown below:

In the Claims

In Column 17, Line 24, in Claim 1, delete "data" and insert --data,-- therefor

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*